United States Patent
Li et al.

(10) Patent No.: US 10,333,444 B2
(45) Date of Patent: Jun. 25, 2019

(54) SYSTEM AND METHOD FOR STABILITY CONTROL IN ADJUSTABLE SPEED DRIVE WITH DC LINK THIN FILM CAPACITOR

(71) Applicants: Eaton Corporation, Cleveland, OH (US); Zhejiang University, Hangzhou (CN)

(72) Inventors: Huaqiang Li, Menomonee Falls, WI (US); Wenxi Yao, Hangzhou (CN); Zhentian Qian, Hangzhou (CN)

(73) Assignees: Eaton Intelligent Power Limited, Dublin (IE); Zhejiang University, Zhejiang (CN)

( * ) Notice: Subject to any disclaimer, the term of this patent is extended or adjusted under 35 U.S.C. 154(b) by 0 days.

(21) Appl. No.: 15/692,898

(22) Filed: Aug. 31, 2017

(65) Prior Publication Data

US 2019/0068097 A1    Feb. 28, 2019

(51) Int. Cl.
*H02P 21/05* (2006.01)
*H02P 21/16* (2016.01)
(Continued)

(52) U.S. Cl.
CPC ............ *H02P 21/05* (2013.01); *G05B 19/416* (2013.01); *H02P 21/16* (2016.02); *H02P 25/024* (2016.02);
(Continued)

(58) Field of Classification Search
CPC ........ H02P 21/05; H02P 21/16; H02P 25/024; H02P 27/12; G05B 19/416
(Continued)

(56) References Cited

U.S. PATENT DOCUMENTS 5,959,431 A * 9/1999 Xiang ................. H02P 23/0004
318/811
6,697,270 B1 2/2004 Kalman et al.
(Continued)

FOREIGN PATENT DOCUMENTS

CN 106982022 A 7/2017
EP 875341 A1 * 11/1998
(Continued)

OTHER PUBLICATIONS

Siemens Low Harmonic Technology, Reducing harmonic currents for SED2, 2002, pp. 1-8.
(Continued)

*Primary Examiner* — Kawing Chan
(74) *Attorney, Agent, or Firm* — Ziolkowski Patent Solutions Group, SC

(57) ABSTRACT

A control system for actively damping an output of an adjustable speed drive (ASD) having a DC link thin film capacitor is programmed to calculate a d-axis damping coefficient and a q-axis damping coefficient for stabilizing an output of the ASD based at least on a voltage across the DC link thin film capacitor at a steady operating point. The control system is further programmed to extract d-axis and q-axis perturbations in d-axis and q-axis output currents of the ASD using a high pass filter, damp the d-axis perturbation and the q-axis perturbation with the d-axis damping coefficient and the q-axis damping coefficient, respectively, and calculate a damping frequency based on the damped d-axis perturbation and the damped q-axis perturbation. The control system is also programmed to damp an angle of rotation of a reference motor speed command for controlling the ASD using the damping frequency.

20 Claims, 12 Drawing Sheets

(51) Int. Cl.
*H02P 25/024* (2016.01)
*H02P 27/12* (2006.01)
*G05B 19/416* (2006.01)
*G06F 17/13* (2006.01)

(52) U.S. Cl.
CPC .... *H02P 27/12* (2013.01); *G05B 2219/49048* (2013.01); *G06F 17/13* (2013.01); *H02P 2201/03* (2013.01); *H02P 2205/07* (2013.01)

(58) Field of Classification Search
USPC .................................................. 318/400.02
See application file for complete search history.

(56) References Cited

U.S. PATENT DOCUMENTS

| | | | | |
|---|---|---|---|---|
| 8,816,616 | B2* | 8/2014 | Costanzo | H02P 29/50 318/400.02 |
| 9,621,092 | B2* | 4/2017 | Oono | B60L 15/20 |
| 9,641,107 | B2* | 5/2017 | Enoki | H02P 6/10 |
| 2008/0206051 | A1* | 8/2008 | Wakasa | F03D 7/0224 416/41 |
| 2009/0033259 | A1 | 2/2009 | Cesario et al. | |
| 2011/0241586 | A1* | 10/2011 | Tobari | H02P 21/06 318/400.23 |
| 2012/0217911 | A1* | 8/2012 | Wu | H02P 6/085 318/400.3 |
| 2014/0268970 | A1* | 9/2014 | Tanaka | H02M 5/297 363/163 |
| 2014/0328091 | A1* | 11/2014 | Sakakibara | H02M 5/458 363/37 |
| 2015/0002072 | A1* | 1/2015 | Mo | H02P 27/047 318/807 |
| 2015/0092460 | A1* | 4/2015 | Tallam | H02M 7/125 363/44 |
| 2016/0141993 | A1* | 5/2016 | Bonke | H02P 25/06 318/400.02 |
| 2016/0327998 | A1 | 11/2016 | Webster et al. | |
| 2017/0310235 | A1* | 10/2017 | Sakakibara | H02M 1/088 |

FOREIGN PATENT DOCUMENTS

| | | |
|---|---|---|
| EP | 2124328 A1 | 11/2009 |
| JP | 10084689 A * | 3/1998 |

OTHER PUBLICATIONS

Yaskawa Industrial Matrix Drive U1000, Yaskawa America, Inc., Drives & Motion Division, Apr. 22, 2015, pp. 1-2.
Lee et al., "DC-Link Voltage Stabilization for Reuced DC-Link Capacitor Inverter," IEEE Transactions on Industry Applications, vol. 50, No. 1, Jan./Feb. 2014, pp. 404-414.
Hinkkanen et al., "Induction Motor Drives Equipped With Diode Rectifier and Small DC-Link Capacitance," IEEE Transactions on Industrial Electronics, vol. 55, No. 1, Jan. 2008, pp. 312-320.
Lee et al., "A New Oscillation Controller Design and Induction Machine Stability Analysis of Volts/Hz based Industrial Adjustable Speed Drives," IEEE ECCE 2013, pp. 3742-3748.
Guha et al., "Small-Signal Stability Analysis of an Open-Loop Induction Motor Drive Including the Effect of Inverter Deadtime," IEEE Transactions on Industry Applications, vol. 52, No. 1, Jan./Feb. 2016, pp. 242-253.
Hinkkanen et al., "Control of Induction Motor Drives Equipped With Small DC-Link Capacitance," IEEE, 2007 European Conference on Power Electronics and Applications, Aalborg, Denmark, Sep. 2-5, 2007, pp. 1-10.
Maheshwari et al., "Closed Loop Control of Active Damped Small DC-link Capacitor Based Drive," 2010 IEEE Energy Conversion Congress and Exposition, pp. 4187-4191.
Maheshwari et al., "An Active Damping Technique for Small DC-Link Capacitor Based Drive System," IEEE Transactions on Industrial Informatics, IEEE Service Center, New York, NY, vol. 9, No. 2, May 2, 2013, pp. 848-858.
Salehifar et al., "Observer-Based Open Transistor Fault Diagnosis and Fault-Tolerant Control of Five-Phase Permanent Magnet Motor Drive for Application in Electric Vehicles," IET Power Electron, UK, vol. 8, No. 1, Jan. 1, 2015, pp. 76-87.

* cited by examiner

Eqn. 9

$$A = \begin{bmatrix} -\dfrac{(R_s+R_{eq})L_r+R_rL_s}{\sigma L_s L_r} & \omega_e - \omega_r & \dfrac{1}{\sigma L_s \tau_r} & \dfrac{\omega_r}{\sigma L_s} & 0 & 0 & 0 \\ \omega_r - \omega_e & -\dfrac{(R_s+R_{eq})L_r+R_rL_s}{\sigma L_s L_r} & -\dfrac{\omega_r}{\sigma L_s} & \dfrac{1}{\sigma L_s \tau_r} & 0 & 0 & \dfrac{k\pi\omega_e}{3\sqrt{3}\sigma L_s \omega_b} \\ 0 & 0 & -\omega_e & \omega_e & 0 & 0 & 0 \\ -(R_s+R_{eq}) & -(R_s+R_{eq}) & 0 & 0 & 0 & 0 & 0 \\ \dfrac{3n_p^2\psi_{sq}}{2J} & \dfrac{3n_p^2\psi_{sd}}{2J} & 0 & 0 & 0 & 0 & \dfrac{k\pi\omega_e}{3\sqrt{3}\omega_b} \\ 0 & 0 & 0 & 0 & 0 & 0 & -\dfrac{1}{L} \\ 0 & -\dfrac{k\pi\omega_e}{2\sqrt{3}C\omega_b} & 0 & 0 & 0 & \dfrac{1}{C} & 0 \end{bmatrix}$$

FIG. 4

Eqn. 16

$$A_0 = \begin{bmatrix} -\dfrac{(R_s+R_{eq0})L_r + R_r L_s}{\sigma L_s L_r} & \omega_{e0}-\omega_{r0} & \dfrac{1}{\sigma L_s \tau_r} & \dfrac{\omega_{r0}}{\sigma L_s} & 0 & 0 \\ \omega_{r0}-\omega_{e0} & -\dfrac{(R_s+R_{eq0})L_r + R_r L_s}{\sigma L_s L_r} & -\dfrac{\omega_{r0}}{\sigma L_s} & \dfrac{1}{\sigma L_s \tau_r} & 0 & \dfrac{\pi \omega_{e0}}{3\sqrt{3}\sigma L_s \omega_{b0}'} \\ 0 & -(R_s+R_{eq0}) & -\omega_{e0} & \omega_{e0} & 0 & 0 \\ -(R_s+R_{eq0}) & 0 & 0 & 0 & 0 & \dfrac{\pi \omega_{e0}}{3\sqrt{3}\omega_{b0}'} \\ \dfrac{3n_p^2 \psi_{sq0}}{2J} & \dfrac{3n_p^2 \psi_{sd0}}{2J} & 0 & 0 & 0 & 0 \\ 0 & 0 & 0 & 0 & 0 & 0 \\ 0 & -\dfrac{\pi \omega_{e0}}{2\sqrt{3}C\omega_b'} & 0 & 0 & \dfrac{1}{C} & -\dfrac{1}{L} \\ 0 & 0 & 0 & 0 & 0 & 0 \end{bmatrix}$$

FIG. 5

Eqn. 19

$$A_1 = \begin{bmatrix} -\dfrac{(R_s+R_{eq0,d})L_r+R_rL_s}{\sigma L_s L_r} & \omega_{s0}+\dfrac{X_{eq0,dq}}{\sigma L_s} & \dfrac{1}{\sigma L_s \tau_r} & \dfrac{\omega_{r0}}{\sigma L_s} & \dfrac{\psi_{sq0}}{\sigma L_s}-i_{sq0} & 0 & -\dfrac{i_{sd0}}{i_{eq0}\sigma L_s}-\dfrac{i_{sq0}}{i_{eq0}}\dfrac{\sigma L_s}{i_{eq0}} \\ -\omega_{s0}+\dfrac{X_{eq0,dq}}{\sigma L_s} & -\dfrac{(R_s+R_{eq0,q})L_r+R_rL_s}{\sigma L_s L_r} & -\dfrac{\omega_{r0}}{\sigma L_s} & \dfrac{1}{\sigma L_s \tau_r} & \dfrac{\psi_{sd0}}{\sigma L_s}-i_{sd0} & 0 & \dfrac{k\pi\omega_e}{3\sqrt{3}\sigma L_s \omega_b}-\dfrac{i_{sd0}}{i_{eq0}} \\ -(R_s+R_{eq0,d}) & X_{eq0,dq} & 0 & \omega_e & 0 & 0 & 0 \\ X_{eq0,dq} & -(R_s+R_{eq0,q}) & -\omega_e & 0 & 0 & 0 & 0 \\ -\dfrac{3n_p^2\psi_{sq0}}{2J} & \dfrac{3n_p^2\psi_{sd0}}{2J} & -\dfrac{3n_p^2 i_{sq0}}{2J} & \dfrac{3n_p^2 i_{sd0}}{2J} & 0 & 0 & \dfrac{k\pi\omega_e}{3\sqrt{3}\omega_b}-\dfrac{i_{sq0}}{i_{eq0}} \\ 0 & 0 & 0 & 0 & 0 & 0 & 0 \\ 0 & -\dfrac{k\pi\omega_e}{2\sqrt{3}C\omega_b} & 0 & 0 & 0 & \dfrac{1}{C} & -\dfrac{1}{L} \\ & & & & & & 0 \end{bmatrix}$$

FIG. 6

Eqn. 25

$$A_d = \begin{bmatrix} -\frac{(R_s+R_{eq})L_r + R_r L_s}{\sigma L_s L_r} & k_d i_{sd2} + k_q i_{sq2} + \omega_e - \omega_r & \frac{1}{\sigma L_s \tau_r} & \frac{\omega_r}{\sigma L_s} & 0 & 0 \\ -k_d i_{sd2} - k_q i_{sq2} + \omega_r - \omega_e & -\frac{(R_s+R_{eq})L_r + R_r L_s}{\sigma L_s L_r} & -\frac{\omega_r}{\sigma L_s} & \frac{1}{\sigma L_s \tau_r} & 0 & \frac{k\pi\omega_e}{3\sqrt{3}\sigma L_s \omega_b} \\ -(R_s+R_{eq}) & 0 & 0 & 0 & 0 & 0 \\ 0 & -(R_s+R_{eq}) & -k_d i_{sd2} - k_q i_{sq2} - \omega_e & k_d i_{sd2} + k_q i_{sq2} + \omega_e & 0 & \frac{k\pi\omega_e}{3\sqrt{3}\sigma L_s \omega_b} \\ \frac{3n_p^2 \psi_{sq}}{2J} & \frac{3n_p^2 \psi_{sd}}{2J} & 0 & 0 & 0 & 0 \\ 0 & 0 & 0 & 0 & 0 & -\frac{1}{L} \\ 0 & -\frac{k\pi\omega_e}{2\sqrt{3}C\omega_b} & 0 & 0 & \frac{1}{C} & 0 \end{bmatrix}$$

FIG. 7

Eqn. 31

$$A_{9d} = \begin{bmatrix} -\dfrac{(R_s+R_{eq})L_r + R_r L_s}{\sigma L_s L_r} & \omega_o + \omega_e - \omega_r & 0 & 0 & \dfrac{1}{\sigma L_s \tau_r} & \dfrac{\omega_r}{\sigma L_s} & 0 & 0 & 0 & 0 \\ \omega_o + \omega_r - \omega_e & -\dfrac{(R_s+R_{eq})L_r + R_r L_s}{\sigma L_s L_r} & 0 & 0 & -\dfrac{\omega_r}{\sigma L_s} & \dfrac{1}{\sigma L_s \tau_r} & 0 & 0 & \dfrac{k\pi\omega_e}{3\sqrt{3}\sigma L_s \omega_b} & 0 \\ \omega_c & 0 & 0 & -\omega_c & 0 & 0 & 0 & 0 & 0 & 0 \\ 0 & \omega_c & -\omega_c & 0 & 0 & 0 & 0 & 0 & 0 & 0 \\ -(R_s+R_{eq}) & 0 & 0 & 0 & 0 & \omega_o - \omega_e & 0 & 0 & 0 & 0 \\ 0 & -(R_s+R_{eq}) & 0 & 0 & \omega_o + \omega_e & 0 & 0 & 0 & 0 & 0 \\ \dfrac{3n_p^2 \psi_{sq}}{2J} & \dfrac{3n_p^2 \psi_{sd}}{2J} & 0 & 0 & 0 & 0 & 0 & 0 & 0 & 0 \\ 0 & 0 & 0 & 0 & 0 & 0 & 0 & 0 & \dfrac{k\pi\omega_e}{3\sqrt{3}\omega_b} & 0 \\ 0 & -\dfrac{k\pi\omega_e}{2\sqrt{3}C\omega_b} & 0 & 0 & 0 & 0 & 0 & 0 & 0 & -\dfrac{1}{L} \\ -\dfrac{k\pi\omega_e}{2\sqrt{3}C\omega_b} & 0 & 0 & 0 & 0 & 0 & 0 & \dfrac{1}{C} & 0 & 0 \end{bmatrix}$$

FIG. 8

Eqn. 35

$$A_{90} = \begin{bmatrix}
-\dfrac{(R_s+R_{eq0})L_r + R_r L_s}{\sigma L_s L_r} & \omega_{e0}-\omega_{r0} & 0 & 0 & \dfrac{1}{\sigma L_s \tau_r} & \dfrac{\omega_{r0}}{\sigma L_s} & 0 & 0 & \dfrac{k\pi\omega_{e0}}{3\sqrt{3}\sigma L_s \omega_{b0}'} & 0 \\
\omega_{r0}-\omega_{e0} & -\dfrac{(R_s+R_{eq0})L_r + R_r L_s}{\sigma L_s L_r} & 0 & 0 & -\dfrac{\omega_{r0}}{\sigma L_s} & \dfrac{1}{\sigma L_s \tau_r} & 0 & 0 & 0 & 0 \\
0 & 0 & 0 & 0 & 0 & 0 & 0 & 0 & 0 & 0 \\
0 & 0 & 0 & 0 & 0 & 0 & 0 & 0 & 0 & 0 \\
-(R_s+R_{eq0}) & 0 & 0 & 0 & 0 & 0 & 0 & 0 & 0 & 0 \\
0 & -(R_s+R_{eq0}) & 0 & 0 & -\omega_{e0} & \omega_{e0} & 0 & 0 & \dfrac{k\pi\omega_{e0}}{3\sqrt{3}\sigma L_s \omega_{b0}'} & 0 \\
-\dfrac{3n_p^2 \psi_{sq0}}{2J} & \dfrac{3n_p^2 \psi_{sd0}}{2J} & 0 & 0 & 0 & 0 & 0 & 0 & 0 & 0 \\
0 & 0 & 0 & 0 & 0 & 0 & 0 & 0 & 0 & 0 \\
0 & -\dfrac{k\pi\omega_{e0}}{2\sqrt{3}C\omega_b'} & 0 & 0 & 0 & 0 & 0 & \dfrac{1}{C} & 0 & -\dfrac{1}{L} \\
0 & 0 & 0 & 0 & 0 & 0 & 0 & 0 & 0 & 0
\end{bmatrix}$$

FIG. 9

Eqn. 37

$$A_{9l} = \begin{bmatrix} -\frac{(R_s+R_{eq0,d})L_r+R_rL_s}{\sigma L_s L_r}+k_d i_{sq0} & \omega_{s0}+\frac{X_{eq0,dq}+k_q i_{sq0}}{\sigma L_s} & -k_d i_{sq0} & -k_q i_{sq0} & \frac{1}{\sigma L_s \tau_r} & \frac{\omega_{r0}}{\sigma L_s} & 0 & 0 & \frac{k\pi\omega_e}{3\sqrt{3}\sigma L_s \omega_b}\frac{i_{sd0}}{i_{eq0}}\sigma L_s & -\frac{i_{sq0}}{i_{eq0}}\sigma L_s \\ -\omega_{s0}+\frac{X_{eq0,dq}}{\sigma L_s}-k_d i_{sd0} & -\frac{(R_s+R_{eq0,q})L_r+R_rL_s}{\sigma L_s L_r}-k_q i_{sd0} & k_d i_{sd0} & k_q i_{sd0} & \frac{\omega_{r0}}{\sigma L_s} & -\frac{1}{\sigma L_s \tau_r} & \frac{\psi_{sq0}}{\sigma L_s}-i_{sq0} & 0 & 0 & 0 \\ \omega_c & 0 & -\omega_c & 0 & 0 & 0 & i_{sd0} & 0 & 0 & 0 \\ 0 & \omega_c & 0 & -\omega_c & 0 & 0 & \frac{\psi_{sd0}}{\sigma L_s} & 0 & 0 & 0 \\ k_d\psi_{sq0}-R_s-R_{eq0,d} & k_q\psi_{sq0}+X_{eq0,dq} & -k_d\psi_{sq0} & -k_q\psi_{sq0} & 0 & 0 & 0 & 0 & 0 & 0 \\ X_{eq0,dq}-k_d\psi_{sd0} & k_q\psi_{sq0}-R_s-R_{eq0,q} & k_d\psi_{sd0} & k_q\psi_{sd0} & -\omega_e & \omega_e & 0 & 0 & 0 & 0 \\ \frac{3n_p^2\psi_{sq0}}{2J} & \frac{3n_p^2\psi_{sd0}}{2J} & 0 & 0 & \frac{3n_p^2 i_{sq0}}{2J} & \frac{3n_p^2 i_{sd0}}{2J} & 0 & 0 & 0 & 0 \\ 0 & 0 & 0 & 0 & 0 & 0 & 0 & 0 & 0 & 0 \\ 0 & \frac{k\pi\omega_e}{2\sqrt{3}C\omega_b} & 0 & 0 & 0 & 0 & 0 & \frac{1}{C} & \frac{k\pi\omega_e}{3\sqrt{3}\omega_b}\frac{i_{sd0}}{i_{eq0}} & -\frac{i_{sq0}}{i_{eq0}} \\ 0 & 0 & 0 & 0 & 0 & 0 & 0 & 0 & -\frac{1}{L} & 0 \end{bmatrix}$$

FIG. 10

SYSTEM AND METHOD FOR STABILITY CONTROL IN ADJUSTABLE SPEED DRIVE WITH DC LINK THIN FILM CAPACITOR

BACKGROUND OF THE INVENTION

The present invention relates generally to adjustable speed drives (ASDs) and, more particularly, to a system and method for stabilizing the output current of ASDs when using small DC link thin film capacitors.

In a conventional ASD, an alternating current (AC) power input is converted to a direct current (DC) power on a DC link by a rectifier and then to an AC power output by an inverter. The AC power output has the desired characteristics for operating an AC motor or other AC driven load. Often, a large electrolytic capacitor bank measuring between a few hundred and thousands of microfarads (μF) is used on the DC link to stabilize the DC link voltage and decouple the inverter side motor control of the ASD from the input rectifier operation. These electrolytic capacitor banks have a large capacity for energy storage and keep the DC link voltage fairly steady. Although electrolytic capacitors are effective to stabilize the DC link voltage, they have several drawbacks.

As one example, when a front end diode rectifier is used in the ASD, the AC input source current becomes severely distorted by the electrolytic capacitor bank such that low order harmonics pollute the utility grid. These harmonics can cause higher root mean square currents through connected transformers and feeder equipment. Sensitive equipment like instrumentation, computers, and communications systems may fail to function correctly or suffer damage.

As another example, electrolytic capacitors dry out and have a limited lifetime, which is a reliability concern. Then, upon replacement of an electrolytic capacitor bank, the capacitors need to be reformed or conditioned if they have been in storage for an extended period of time. This results in an inefficient installation process. The electrolytic capacitors will lose their charge in storage, so they need to be pre-charged. If the electrolytic capacitor banks are not pre-charged before energizing the ASD and the ASD does not have a pre-charge circuit, a high inrush current can flow through the rectifier and into the electrolytic DC link capacitor bank.

Because of the drawbacks of using electrolytic capacitors, smaller thin film capacitors are being used as a replacement. Thin film capacitors provide enhanced reliability, improved input current harmonic performance, reduced system size and cost, and out of the box installation with unlimited shelf life. However, thin film capacitors generally cannot provide the stability that electrolytic capacitors can. A significant amount of total harmonic distortion (THD) and DC link voltage ripple may thus be present in the system when thin film capacitors are employed.

In order to overcome the instability of the thin film capacitors, stability control strategies have been developed for ASDs. However, these control strategies generally include complicated algorithms that are not intuitive for users. In addition, while the control strategies may make the system more stable, they still do not provide enough stability for the ASD to produce a sine wave current, which is the ASD output for operating motors. Instead, the ASD output may approximate an oscillating wave, for example.

It would therefore be desirable to provide a system and method for analyzing and controlling the stability of an ASD with a small DC link thin film capacitor bank such that the ASD is stable under all normal operating conditions and the ASD output approximates a sine wave with low THD and DC link voltage ripple.

BRIEF DESCRIPTION OF THE INVENTION

Embodiments of the present invention provide a system and method for controlling the stability of an ASD incorporating a small DC Link thin film capacitor.

In accordance with one aspect of the invention, a control system for actively damping an output of an ASD having a DC link thin film capacitor is programmed to calculate a d-axis damping coefficient and a q-axis damping coefficient for stabilizing an output of the ASD based at least on a voltage across the DC link thin film capacitor at a steady operating point. The control system is further programmed to extract d-axis and q-axis perturbations in d-axis and q-axis output currents of the ASD using a high pass filter, damp the d-axis perturbation and the q-axis perturbation with the d-axis damping coefficient and the q-axis damping coefficient, respectively, and calculate a damping frequency based on the damped d-axis perturbation and the damped q-axis perturbation. The control system is also programmed to damp an angle of rotation of a reference motor speed command for controlling the ASD using the damping frequency.

In accordance with another aspect of the invention, a method of stabilizing an ASD having a DC link thin film capacitor incorporated therein includes receiving, at a controller, input parameters comprising a current output by the ASD from a current sensor and a reference motor speed command and computing, with the controller, a d-axis stabilization factor and a q-axis stabilization factor for stabilizing the ASD based on at least one steady state voltage across the DC link thin film capacitor. The method additionally includes transforming the current output by the ASD into a d-axis current and a q-axis current with the controller, obtaining d-axis and q-axis perturbations in the d-axis and q-axis currents, respectively, with a high pass filter in the controller, and compensating the d-axis perturbation and the q-axis perturbation with the controller using the d-axis stabilization factor and the q-axis stabilization factor, respectively. Furthermore, the method includes computing a feedback frequency with the controller based on the compensated d-axis perturbation and the compensated q-axis perturbation and compensating a reference motor speed command with the feedback frequency to change an angle of rotation for controlling an inverter of the ASD.

In accordance with yet another aspect of the invention, an ASD includes an input connectable to an AC source, a rectifier connected to the input to convert an AC power input to a DC power at an output thereof, and a DC link coupled to the rectifier output to receive the DC power therefrom. The DC link has a thin film capacitor and an inductor positioned thereon and is coupled to a DC side of an inverter having an AC side connectable to a motor. The ASD includes at least one current sensor configured to measure currents output from the AC side of the inverter and a control system coupled to the inverter as well. The control system is programmed to determine a d-axis compensation coefficient and a q-axis compensation coefficient designed to stabilize the ASD output currents under all operating conditions based on at least one steady operating point for a set of operating parameters including voltage across the DC link thin film capacitor and a current through the inductor. In addition, the control system is programmed to extract a perturbation in the inverter output currents from the at least one current sensor using a high pass filter, compensate a d-axis component of the perturbation using the d-axis compensation coefficient and a q-axis component of the perturbation using the q-axis compensation coefficient, and determine a compensation frequency by combining the compensated d-axis and q-axis perturbations. Moreover, the control system is programmed to add the compensation frequency to a reference motor speed command to adjust an angle of rotation for controlling the inverter and control the inverter based on the amplitude of the reference motor speed command and the adjusted angle of rotation.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings:

FIG. 4 is a coefficient matrix, A, for a state space model of the ASD system of FIGS. 1-2, according to an embodiment of the invention, according to an embodiment of the invention.

FIG. 5 is a coefficient matrix, $A_0$, resulting from entering steady operating values into the coefficient matrix, A, of FIG. 5, according to an embodiment of the invention.

FIG. 6 is a coefficient matrix, $A_1$, obtained from the linearization of the coefficient matrix, A, of FIG. 5, according to an embodiment of the invention.

FIG. 7 is a coefficient matrix, $A_d$, obtained by incorporating the active damping module of the controller of the ASD of FIGS. 1-2 into the coefficient matrix, A, of FIG. 4, according to an embodiment of the invention.

FIG. 8 is a coefficient matrix, $A_{9d}$, obtained by expanding the coefficient matrix, $A_d$, from a 7×7 matrix to a 9×9 matrix, according to an embodiment of the invention.

FIG. 9 is a coefficient matrix, $A_{90}$, resulting from entering steady operating values into the coefficient matrix, $A_{9d}$, of FIG. 8, according to an embodiment of the invention.

FIG. 10 is a coefficient matrix, $A_{9l}$, obtained from the linearization of the coefficient matrix, $A_{9d}$, of FIG. 8, according to an embodiment of the invention.

DETAILED DESCRIPTION

Embodiments of the invention relate to a system and method for controlling an ASD that includes a small DC link thin film capacitor such that the ASD is stable under all normal operating conditions. The ASD includes a control system that is programmed or configured to analyze the stability of the ASD output and actively stabilize the output of the ASD. The control system calculates compensation, stabilizing, or damping coefficients, constants, or factors and a corner frequency for a high pass filter for equilibrium or steady operating points using Lyapunov's First Method. The control system extracts perturbations in current output by the ASD, compensates the perturbations by multiplying them with the compensation coefficients, and adds the compensated perturbations together to obtain a feedback, compensation, or damping frequency or speed. The control system then adds the compensation frequency to a reference motor speed command in order to modify, alter, or adjust an angle of rotation used to control an inverter of the ASD. This active damping control scheme significantly reduces the ASD output current THD and DC link voltage ripple.

Figure 1:
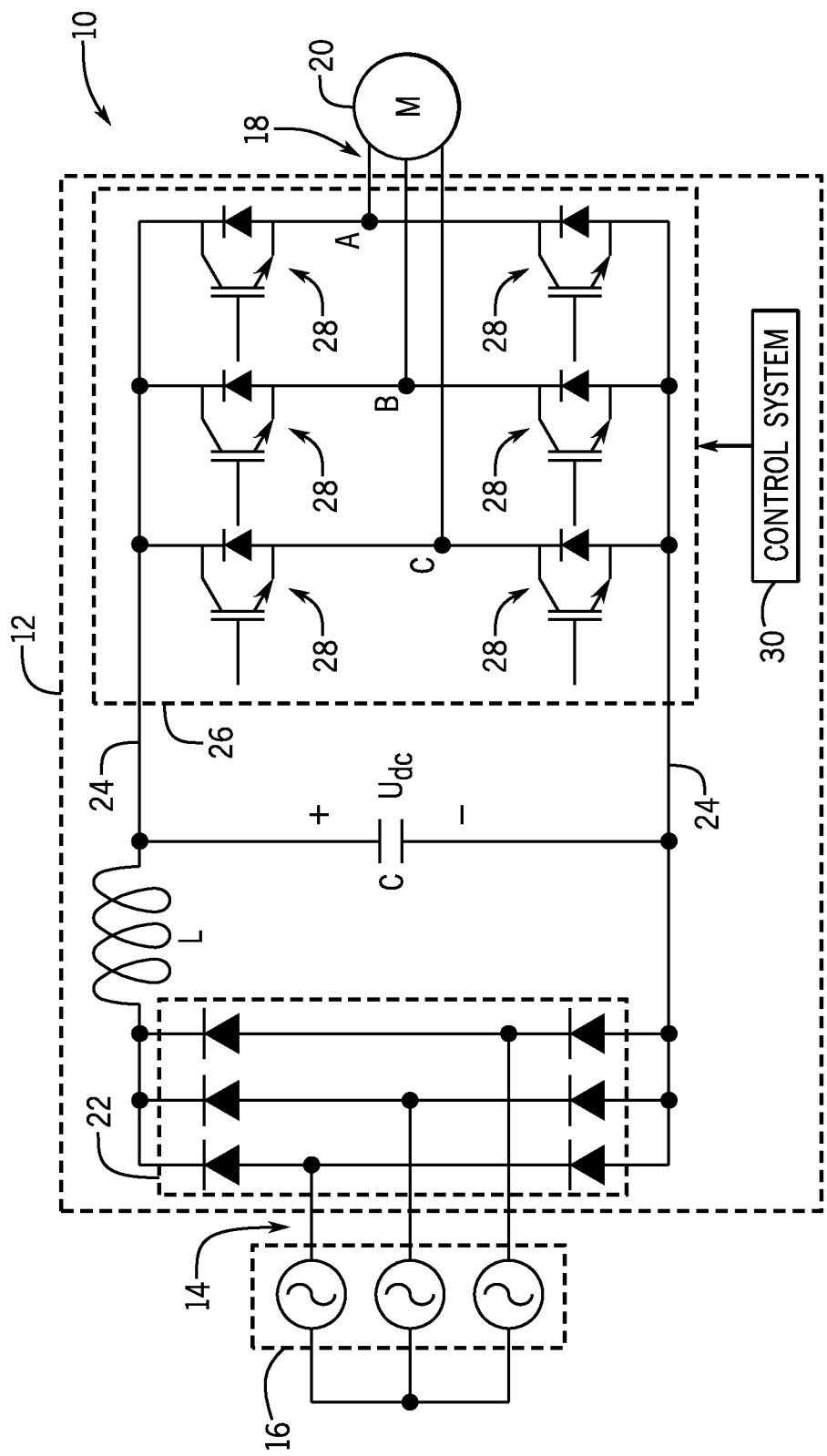
FIG. 1 is a schematic of an ASD system including an ASD having a small DC link thin film capacitor, according to an embodiment of the invention.

Referring to FIG. 1, an ASD system or circuit 10 including an ASD 12 is shown, according to an embodiment of the invention. ASD 12 includes an input 14 connected to an AC source 16 and an output 18 connected to a motor or induction machine 20. ASD 12 further includes a rectifier 22 connected between input 14 and an inductor, L; a DC link 24 having a small DC link thin film capacitor, C, thereacross; and an inverter 26 having a plurality of switch-diode pairs 28 coupled between DC link 24 and output 18. Small DC link thin film capacitor, C, may also be in the form of a capacitor bank having multiple small DC link thin film capacitors. ASD 12 also includes a control system or controller 30 for controlling inverter 26. ASD 12 may additionally include a filter, such as, for example, an electromagnetic interference filter or LC filter, at input 14 and/or output 18.

Figure 2:
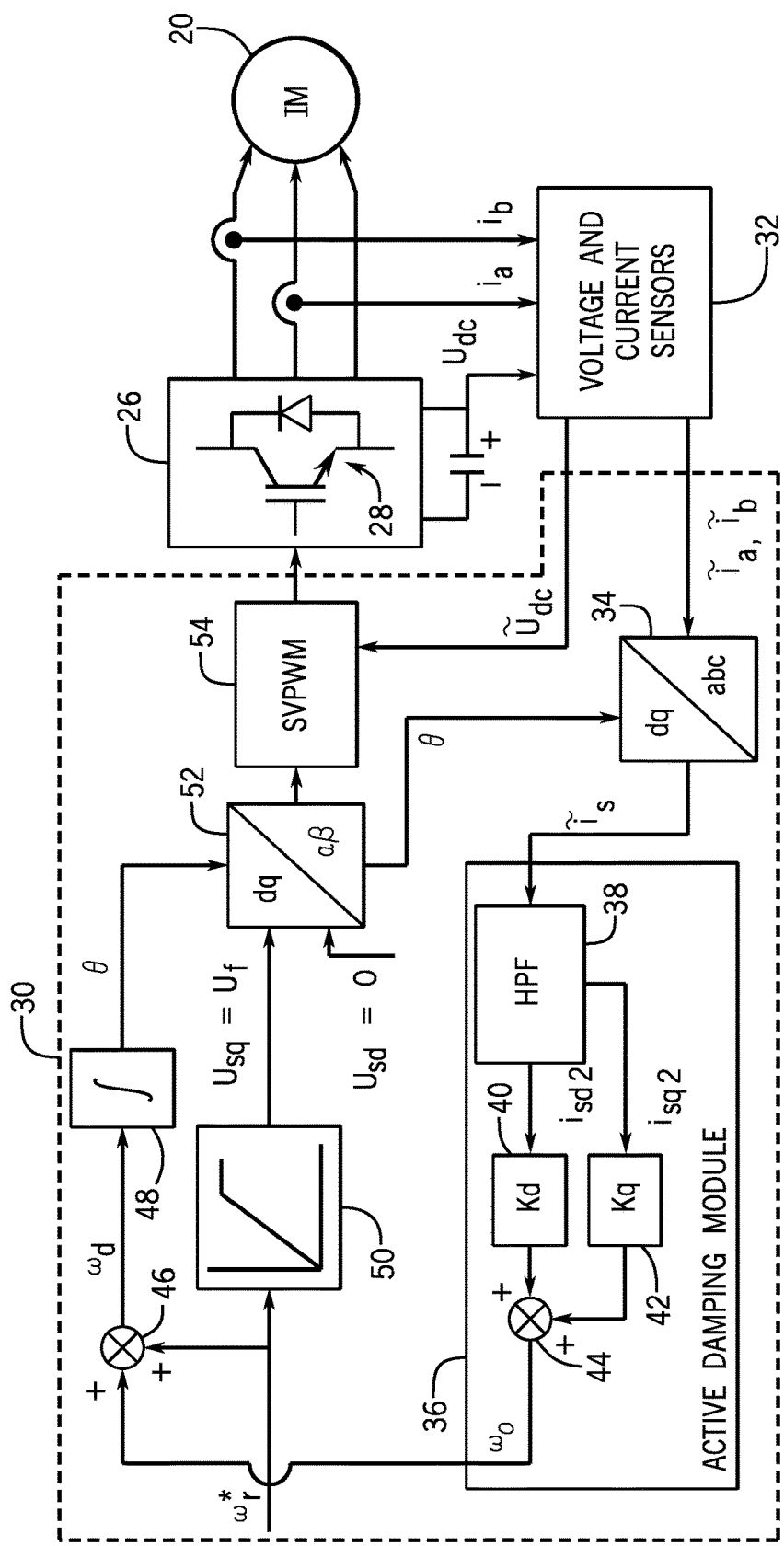
FIG. 2 is a block diagram of the ASD system of FIG. 1 including a more detailed view of a controller of the ASD having an active damping module, according to an embodiment of the invention.

Referring now to FIG. 2, ASD system 10 of FIG. 1 including ASD 12 is shown with a more detailed view of controller 30, according to an embodiment of the invention. As shown, ASD 12 additionally includes a set of sensors 32 including at least one voltage and current sensor for sensing or measuring a DC link voltage, $u_{dc}$, across the DC link thin film capacitor, C, and two phases of the output current, $i_a$, $i_b$, flowing from inverter 26 to induction machine 20. While phase a and b output currents, $i_a$ $i_b$, of inverter 26 are being measured in FIG. 2, the output currents of phases b and c or phases a and c may be measured instead. At a dq/abc block 34, the sampled phase a and b output currents, $\tilde{i}_a$, $\tilde{i}_b$, measured by the current sensors are then transformed from an abc reference frame in which the a, b, and c axes are in the same plane 120° apart from each other to a direct-quadrature (dq) reference frame in which the d and q axes are 90° apart from each other and the d axis is rotated away from the a axis toward the b axis by an angle of rotation, θ, using a Clarke Transform and then a Park Transform with the angle of rotation, θ, from a previous iteration of the control scheme. The output of dq/abc block 34 is a sampled current, $\tilde{i}_s$, in the dq reference frame that is input into an active damping module 36.

Active damping module 36 includes a high pass filter (HPF) 38 that extracts a perturbation or variation in the sampled current, $\tilde{i}_s$, according to:

$$\begin{cases} i_{sd2} = \dfrac{s}{s+\omega_c}\tilde{i}_{sd} \\ i_{sq2} = \dfrac{s}{s+\omega_c}\tilde{i}_{sq} \end{cases} \quad \text{[Eqn. 1]}$$

where $\tilde{i}_{sd}$ is the d-axis component of the sampled current, $\tilde{i}_s$; $\tilde{i}_{sq}$ is the q-axis component of the sampled current, $\tilde{i}_s$; $\omega_c$ is the corner or cutoff frequency of HPF 38; $i_{sd2}$ is the d-axis component of the perturbation; and $i_{sq2}$ is the q-axis component of the perturbation. After the perturbation has been extracted by HPF 38, active damping module 36 damps, compensates, or stabilizes the perturbation. More specifically, active damping module 36 multiplies the d-axis component of the perturbation, $i_{sd2}$, and the q-axis component of the perturbation by respective d-axis and q-axis damping, compensation, or stabilization coefficient, constant, or factors, $k_d$, $k_q$, at damping, compensation, or stabilization blocks 40, 42. The selection of the damping coefficients, $k_d$, $k_q$, and the cutoff frequency, $\omega_c$, will be discussed further below with respect to FIG. 11.

Once the perturbation has been damped, active damping module 36 obtains a feedback, compensation, or damping frequency, $\omega_o$, at the output of summation block 44 according to:

$$\omega_o = k_d i_{sd2} + k_q i_{sq2} \quad [\text{Eqn. 2}]$$

Compensation frequency, $\omega_o$, is the output of active damping module 36 and is fed into summation block 46 along with a reference motor speed command, $\omega_r^*$, which is an input for controller 30. Reference motor speed command, $\omega_r^*$, is a scalar command such as, for example, $100*\pi$ radians/second in one non-limiting embodiment. Summation block 46 adds compensation frequency, $\omega_o$, with reference motor speed command, $\omega_r^*$, to obtain a damped, compensated, or stabilized speed, $\omega_d$. The damped speed, $\omega_d$, is then integrated at integration block 48 to obtain a damped, compensated, or stabilized angle of rotation, $\theta$, for the dq reference frame. The angle of rotation, $\theta$, is adjusted, modified, or altered from what the angle of rotation would have been if reference motor speed command, $\omega_r^*$, were integrated without adding compensation frequency, $\omega_o$. The above-described adjustment made via compensation frequency, $\omega_o$, is how controller 30 stabilizes the output of inverter 26 of ASD 12.

Reference motor speed command, $\omega_r^*$, is also input into a Volts per Hertz (V/Hz) block 50 simultaneously with summation block 46. Based on the reference motor speed command, $\omega_r^*$, V/Hz block 50 outputs an inverter output voltage reference, $u_f$, according to:

$$u_f = u_{sq} = kU_b \frac{\omega_e}{\omega_b}, \quad [\text{Eqn. 3}]$$

where $u_{sq}$ is the q-axis component of the inverter output voltage reference, $u_f$; k is a constant that can be set to a desired value to control the output of V/Hz block 50; $U_b$ is the base voltage of induction machine 20; $\omega_e$ is the synchronous speed of induction machine 20; and $\omega_b$ is the rated speed of induction machine 20. In a non-limiting embodiment in which ASD 12 is equipped with a small 3% DC link thin film capacitor (where 100% would be when an electrolytic capacitor is used), k is set to a value of 0.9. The d-axis component, $u_{sd}$, of the inverter output voltage reference, $u_f$, is set to 0. Since the compensation frequency, $\omega_o$, is not added to the reference motor speed command, $\omega_r^*$, before being input into V/Hz block 50, the compensation frequency, $\omega_o$, does not affect the inverter output voltage reference, $u_f$.

The inverter output voltage reference, $u_f$, along with the adjusted angle of rotation, $\theta$, is input into dq/αβ block 52. dq/αβ block 52 performs an inverse Park Transform on the inverter output voltage reference, $u_f$, using the adjusted angle of rotation, $\theta$, to transform the inverter output voltage reference, $u_f$, from the dq reference frame to an αβ in which an α axis is aligned with the a axis and a β axis is perpendicular to the α axis. dq/αβ block 52 outputs the result of the transformation to a space vector pulse width modulation (SVPWM) block 54. SVPWM block 54 controls inverter 26 according to the output of dq/αβ block 52 and the sampled DC link voltage, $\tilde{u}_{dc}$, from sensors 32.

Figure 3:
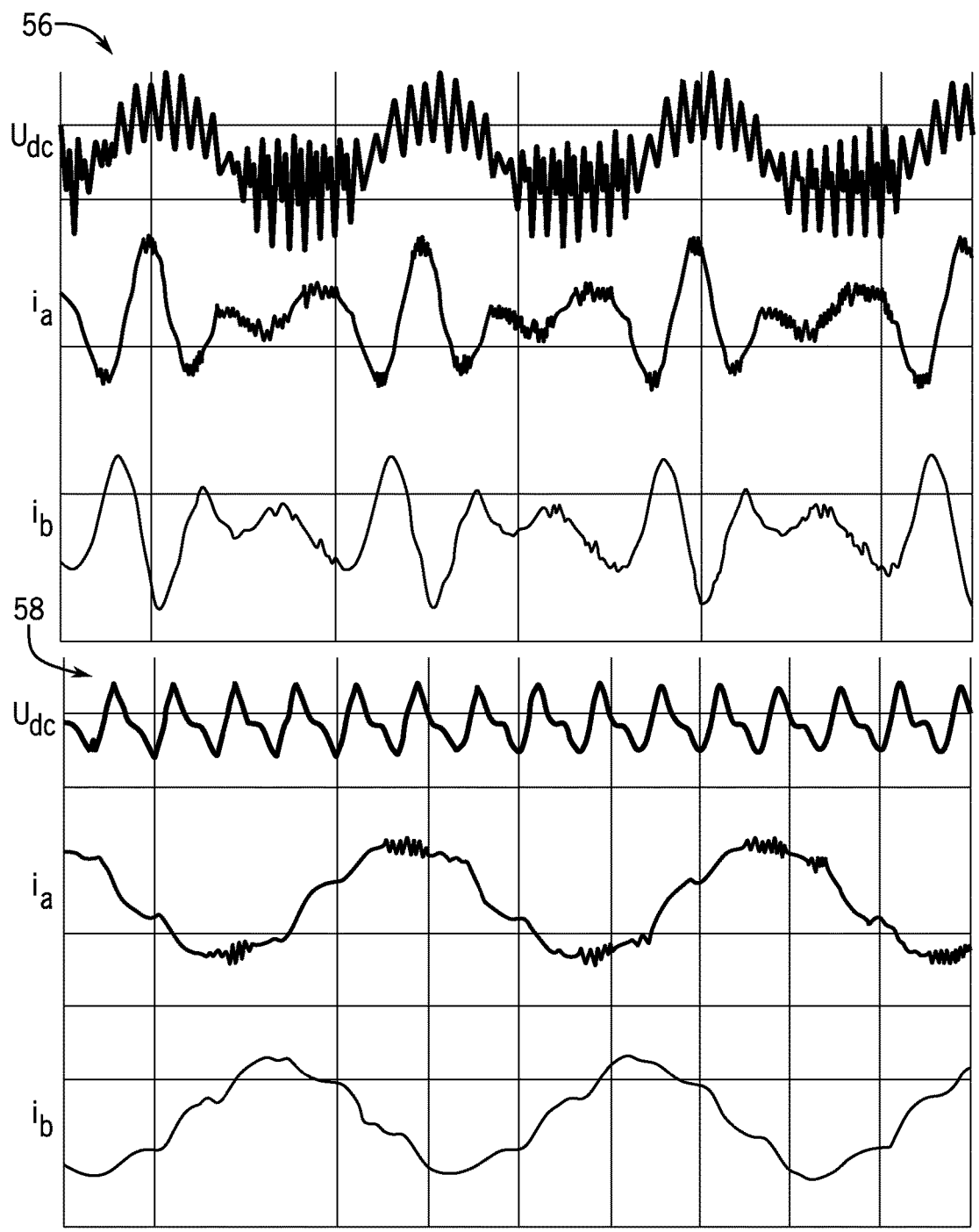
FIG. 3 is a pair of graphs comparing DC link voltage, $u_{dc}$, voltage ripple, and phase a and b output currents, $i_a$, $i_b$, at 50 Hz with and without the control scheme provided by the controller of the ASD of FIGS. 1-2.

Referring now to FIG. 3, a pair of graphs 56, 58 comparing DC link voltage, $u_{dc}$, voltage ripple, and phase a and b output currents, $i_a$, $i_b$, at 50 Hz are shown with and without the control scheme provided by controller 30 of FIGS. 1-2. As shown in graph 58, without the use of the control scheme provided by controller 30, there is a 264V DC link voltage, $u_{dc}$, ripple, and the phase a and b output currents, $i_a$, $i_b$, are distorted with a 58% THD and do not approximate the desired sine wave output. However, as shown in graph 58, when using the control scheme provided by controller 30, the DC link voltage, $u_{dc}$, ripple is reduced to 100V and the THD on the phase a and b output currents, $i_a$, $i_b$, is reduced to 16%. In addition, the phase a and b output currents, $i_a$, $i_b$, more closely approximate a sine wave for operating motor 20. Thus, the control scheme implemented by controller 30 provides a significant improvement in the DC link voltage, $u_{dc}$, ripple and the THD and waveform shape in the current output by inverter 26. In other words, the control scheme of controller 30 is effective to stabilize the output of ASD 12 of FIGS. 1-2.

In order to analyze the stability of ASD system 10, ASD system 10 may be described or modeled as a state space equation including the V/Hz control of ASD 12 and taking into account the voltage fluctuation on small DC link thin film capacitor, C, using a 7×7 matrix. The state space equation for ASD system 10 not including active damping module 36 is given by:

$$\frac{dx}{dt} = Ax + Bu, \quad [\text{Eqn. 4}]$$

where x is the state vector including the system state variables; u is the input vector including the system inputs; and A and B are system coefficient matrices including coefficients describing ASD system 10. State vector, x, is a 7×1 matrix, the transpose of which is given by:

$$x = [i_{sd} i_{sq} \psi_{sd} \psi_{sq} \omega_r i_L u_C]^T \quad [\text{Eqn. 5}],$$

where $i_{sd}$, $i_{sq}$ are the stator current on the d and q axis; $\psi_{sd}$, $\psi_{sq}$ are the stator flux on the d and q axis; $\omega_r$ is the rotor speed; $i_L$ is the current flowing through inductor, L; and $u_C$ is the voltage on small DC link thin film capacitor, C.

Input vector, u, is a 2×1 matrix, the transpose of which is given by:

$$u = [T_L E]^T \quad [\text{Eqn. 6}],$$

where $T_L$ is the load torque and E is given by:

$$E = \frac{3\sqrt{2}}{\pi} V_{LL}, \quad [\text{Eqn. 7}]$$

where $V_{LL}$ is the three-phase source line voltage.

Coefficient matrix, B, is a 7×2 matrix, the transpose of which is given by:

$$B = \begin{bmatrix} 0 & 0 & 0 & 0 & -\frac{n_p}{J} & 0 & 0 \\ 0 & 0 & 0 & 0 & 0 & \frac{1}{L} & 0 \end{bmatrix}^T, \quad [\text{Eqn. 8}]$$

where $n_p$ is the number of poles and J is the inertia of motor 20.

The coefficient matrix, A, is a 7×7 matrix given by Eqn. 9, which is shown in FIG. 4. In the coefficient matrix, A, $L_m$ is the mutual inductance; $L_s$ is the stator inductance; $L_r$ is the rotor inductance; $R_s$ is the stator resistance; and $R_r$ is the rotor resistance. In addition, $\sigma$, $\tau_r$, and $R_{eq}$ (the equivalent resistance caused by the dead-time, $t_d$) are given by:

$$\sigma = 1 - \frac{L_m^2}{L_s L_r};$$ [Eqn. 10]

$$\tau_r = \frac{L_r}{R_r};$$ [Eqn. 11]

$$R_{eq} = \frac{4 t_d f_{sw} u_C}{\pi \sqrt{i_{sd}^2 + i_{sq}^2}},$$ [Eqn. 12]

where $f_{sw}$ is the switching frequency.

Eqn. 4 shows that ASD system 10 is a coupled nonlinear system. In order to analyze the stability of the nonlinear system, Lyapunov's First Method is adopted. An equilibrium, steady state, or steady operating point solution for Eqn. 4 is given by:

$$0_{7,1} = A_0 x_0 + B u_0$$ [Eqn. 13], where $0_{7,1}$ is a 7×1 matrix in which every element is "0"; $x_0$ is the state vector, x, at a steady operating point, the transpose of which is given by:

$$x_0 = [i_{sd0} i_{sq0} \psi_{sd0} \psi_{sq0} \omega_r i_{L0} u_{C0}]^T$$ [Eqn. 14];

$u_0$ is the input vector, u, at a steady operating point, the transpose of which is given by:

$$u_0 = [T_{L0} E_0]^T$$ [Eqn. 15];

and $A_0$ is coefficient matrix, A, at a steady operating point given by Eqn. 16, which is shown in FIG. 5. In coefficient matrix, $A_0$, $\omega_b'$ is given by:

$$\omega_b' = \frac{\omega_b}{k}.$$ [Eqn. 17]

The subscript "0" at the end of system variables in Eqns. 13-15 represents system variables at the steady operating point. Controller 30 may be used to obtain the steady state solution for Eqn. 13.

The state equation of the small-signal system is obtained by linearization and is given by:

$$\frac{dx}{dt} = A_l x + B u,$$ [Eqn. 18]

where $A_l$ is coefficient matrix, A, after the linearization and is given by Eqn. 19, which is shown in FIG. 6. In Eqn. 18, $R_{eq0,d}$, $R_{eq0,q}$, $X_{eq0,dq}$, and $i_{eq0}$ are given by:

$$R_{eq0,d} = R_{eq0} \frac{i_{sq0}^2}{i_{sd0}^2 + i_{sq0}^2},$$ [Eqn. 20]

$$R_{eq0,q} = R_{eq0} \frac{i_{sd0}^2}{i_{sd0}^2 + i_{sq0}^2},$$ [Eqn. 21]

$$X_{eq0,dq} = R_{eq0} \frac{i_{sd0} i_{sq0}}{i_{sd0}^2 + i_{sq0}^2},$$ [Eqn. 22]

$$i_{eq0} = \frac{u_{C0}}{R_{eq0}}.$$ [Eqn. 23]

Controller 30 may be used to calculate the eigenvalues of Eqn. 18 by substituting the parameters of ASD system 10 and the steady state solution from Eqn. 13. These eigenvalues give the pole distribution for ASD system 10. Any eigenvalues/poles located in the right half of the s-plane will make the system unstable. Thus, if controller 30 determines that any poles are located in the right half of the s-plane, ASD system 10 is unstable. Analyzing ASD system 10 using Eqns. 4, 13, and 18 provide a benefit over previous systems by incorporating the current, $i_L$ through inductor, L, and the voltage, $u_C$, across DC link thin film capacitor, C, such that state vector, x, includes 7 variables and coefficient matrix, A, is a 7×7 matrix.

In order to stabilize any instability found by analyzing ASD system 10 using Eqns. 4, 13, and 18, the damping coefficients, $k_d$, $k_q$, and the cutoff frequency, $\omega_c$, are incorporated into the system model. To incorporate the damping coefficients, $k_d$, $k_q$, and the cutoff frequency, $\omega_c$, into the model given by Eqn. 4, the model given by Eqn. 4 is modified to include active damping module 36 according to:

$$\frac{dx}{dt} = A_d x + B u,$$ [Eqn. 24]

where $A_d$ is the coefficient matrix, A, modified by active damping module 36 according to Eqn. 25, which is shown in FIG. 7. However, because the d-axis and q-axis perturbations, $i_{sd2}$, $i_{sq2}$, are not represented by state variables in coefficient matrix, $A_d$, intermediate d-axis and q-axis perturbations, $i_{sd1}$, $i_{sq1}$, are introduced according to:

$$\begin{cases} i_{sd1} = \frac{\omega_c}{s + \omega_c} \tilde{i}_{sd} \\ i_{sq1} = \frac{\omega_c}{s + \omega_c} \tilde{i}_{sq} \end{cases}.$$ [Eqn. 26]

As such, the d-axis and q-axis perturbations, $i_{sd2}$, $i_{sq2}$, are now given by:

$$\begin{cases} i_{sd2} = \tilde{i}_{sd} - i_{sd1} \\ i_{sq2} = \tilde{i}_{sq} - i_{sq1} \end{cases}.$$ [Eqn. 27]

Hence, the complete model for ASD system 10 incorporating active damping module 36 is given by:

$$\frac{dx_9}{dt} = A_{9d} x_9 + B_9 u,$$ [Eqn. 28]

where $x_9$ is a state vector having 9 state variables, the transpose of which is given by:

$$x_9 = [i_{sd} i_{sq} i_{sd1} i_{sq1} \psi_{sd} \psi_{sq} \omega_r i_L u_C]^T$$ [Eqn. 29];

$B_9$ is a 9×2 coefficient matrix, the transpose of which is given by:

$$B_9 = \begin{bmatrix} 0 & 0 & 0 & 0 & -\frac{n_p}{J} & 0 & 0 \\ 0 & 0 & 0 & 0 & 0 & \frac{1}{L} & 0 \end{bmatrix}^T.$$ [Eqn. 30]

and $A_{9d}$ is coefficient matrix, $A_d$, modified to a 9×9 coefficient matrix given by Eqn. 31, which is shown in FIG. 8.

In order to solve for the damping coefficients, $k_d$, $k_q$, and the cutoff frequency, $\omega_c$, using Lyapunov's First Method, the steady state and small-signal system equations must be found. The steady state equation is given by:

$$0_{9,1} = A_{90} x_{90} + B_9 u_{90}$$ [Eqn. 32], where $0_{9,1}$ is a 9×1 matrix in which every element is "0"; $x_{90}$ is the state vector, $x_9$, at a steady operating point, the transpose of which is given by:

$$x_{90}=[i_{sd0} i_{sq0} i_{sd10} i_{sq10} \psi_{sd0} \psi_{sq0} \omega_{r0} i_{L0} u_{C0}]^T \quad \text{[Eqn. 33]};$$

$u_0$ is the input vector, $u$, at a steady operating point, the transpose of which is given by:

$$u=[T_{L0} E_0]^T \quad \text{[Eqn. 34]};$$

and $A_{90}$ is the coefficient matrix, $A_{9d}$, at a steady operating point given by Eqn. 35, which is shown in FIG. 9. The state equation of the small-signal system obtained by linearization of Eqn. 28 is given by:

$$\frac{dx_9}{dt} = A_{9l} x_9 + B_9 u, \quad \text{[Eqn. 36]}$$

where $A_{9l}$ is the coefficient matrix, $A_9$, after the linearization and is given by Eqn. 37, which is shown in FIG. 10.

Figure 11A:
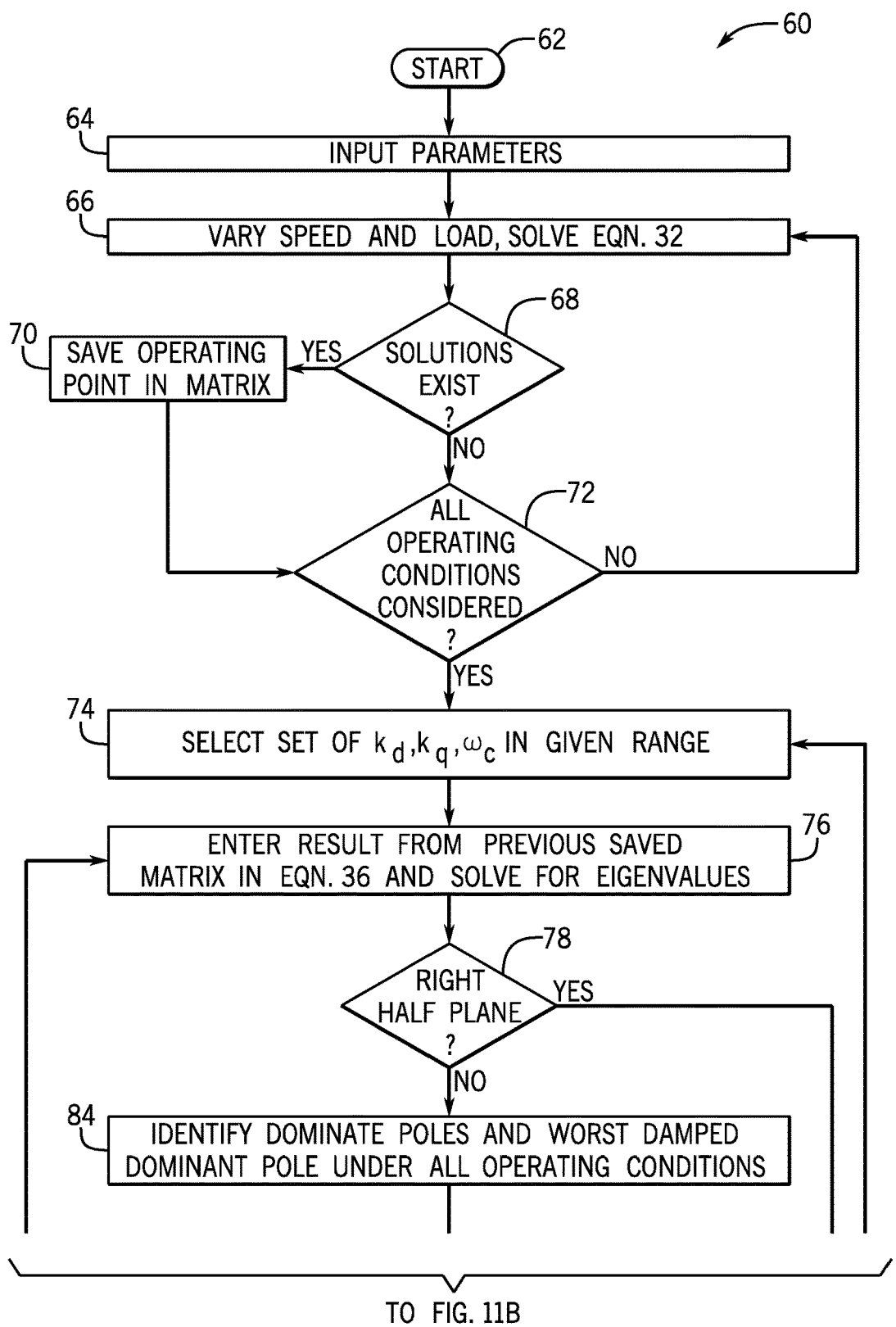
FIGS. 11A-11B are a flowchart illustrating a technique for determining d-axis and q-axis compensation coefficients and a cutoff frequency for stabilizing the ASD system of FIGS. 1-2, according to an embodiment of the invention.
Figure 11B:
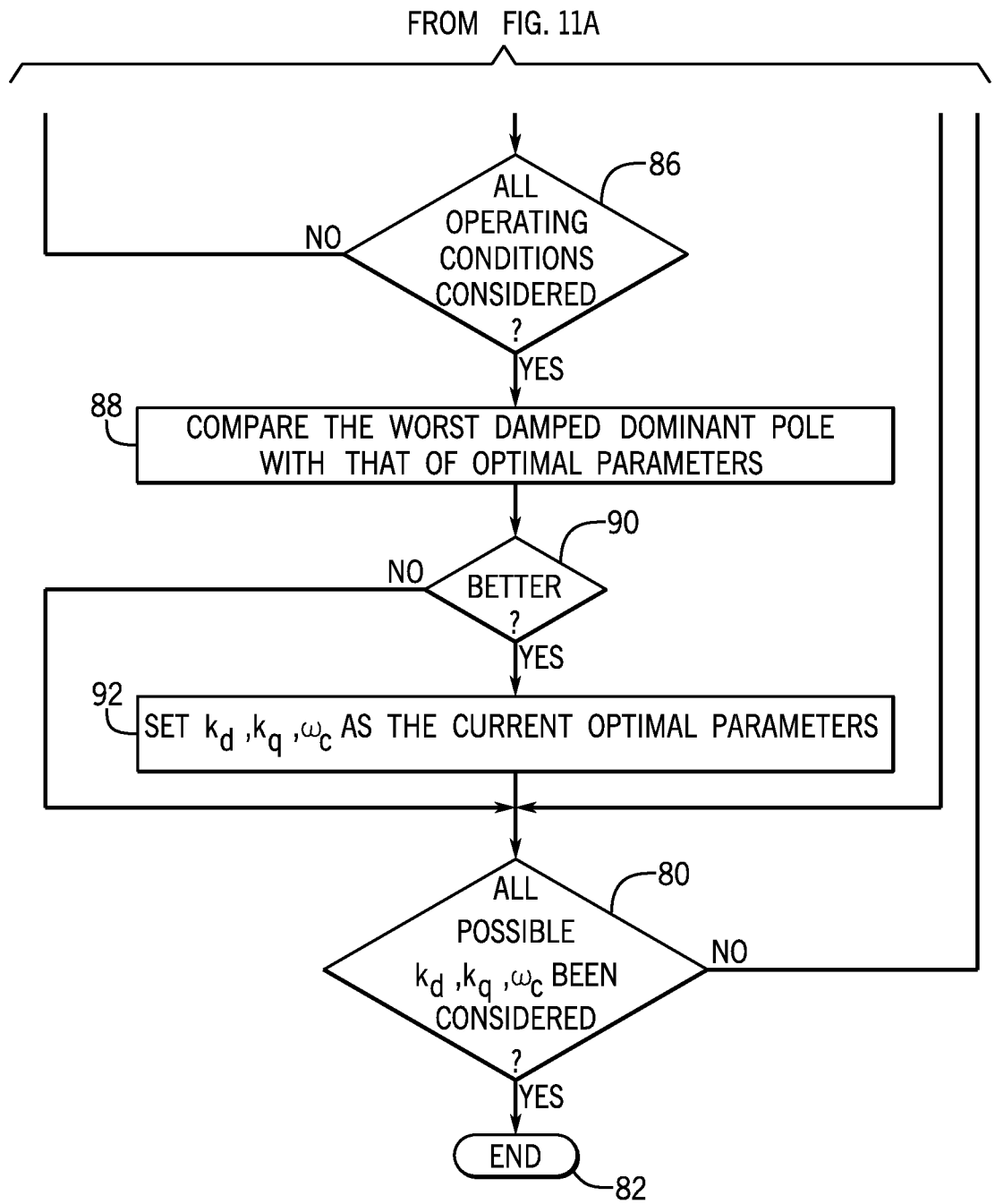

Referring now to FIGS. 11A-11B, a technique or process 60 is shown for determining the appropriate values for the d-axis and q-axis compensation coefficients, $k_d$, $k_q$, and the cutoff frequency, $\omega_c$, used by active damping module 36 in controller 30 of ASD 12 shown in FIGS. 1-2. Process 60 may be performed by controller 30 of ASD 12 or by another controller. However, process 60 will be described as though controller 30 is performing process 60. The d-axis and q-axis compensation coefficients, $k_d$, $k_q$, and the cutoff frequency, $\omega_c$, must be calculated by controller 30 before controller 30 can effectively stabilize the output of inverter 26 of ASD 12. Process 60 is described below in conjunction with Eqns. 35 and 39 that are used by controller 30 in process 60 to solve for the d-axis and q-axis compensation coefficients, $k_d$, $k_q$, and the cutoff frequency, $\omega_c$.

Process 60 starts at STEP 62 when controller 30 is activated. At STEP 64, a wide variety of operating parameters for motor 20 are input into controller 30. The operating parameters are used in Eqn. 35. Controller 30 solves Eqn. 35 for $x_{90}$ multiple times by varying the rotor speed from low frequency to rated frequency, such as, for example, from 5 Hz to 50 Hz, and by varying the load from no load to full load. At STEP 68, if a solution for $x_{90}$ exists at any steady operating point, controller 30 saves that solution in a matrix at STEP 70. Because $x_{90}$ is a 9×1 matrix and all of the solutions are stored in the same matrix, the resulting solution matrix is a 9×N matrix, where N is the number of solutions. After controller 30 saves a solution at STEP 70 or determines that a solution did not exist at STEP 68, controller 30 determines whether all operating conditions have been considered at STEP 72. If some operating conditions have not been considered, process 60 moves back to STEP 66 to vary the operating conditions.

Once controller 30 has considered all operating conditions, process 60 moves to STEP 74. At STEP 74, a set of the d-axis and q-axis compensation coefficients, $k_d$, $k_q$, and the cutoff frequency, $\omega_c$, are chosen or selected from a given range. At STEP 76, controller 30 enters the selected values for the d-axis and q-axis compensation coefficients, $k_d$, $k_q$, and the cutoff frequency, $\omega_c$, into Eqn. 39. After controller 30 has solved for the eigenvalues (poles and zeros) of Eqn. 39 for the selected values for the d-axis and q-axis compensation coefficients, $k_d$, $k_q$, and the cutoff frequency, $\omega_c$, controller 30 determines if any of the resulting eigenvalues are positioned in the right half of the s-plane at STEP 78. Eigenvalues located in the right half of the s-plane will make the system unstable. Thus, if controller 30 determines that any eigenvalues are in the right half of the s-plane, controller 30 discards the currently selected values for the d-axis and q-axis compensation coefficients, $k_d$, $k_q$, and the cutoff frequency, $\omega_c$, and process 60 moves to STEP 80. At STEP 80, controller 30 determines whether all possible values for the d-axis and q-axis compensation coefficients, $k_d$, $k_q$, and the cutoff frequency, $\omega_c$, have been considered. If so, process 60 ends at STEP 82. If not, process 60 moves back to STEP 74, where controller 30 selects another set of the d-axis and q-axis compensation coefficients, $k_d$, $k_q$, and the cutoff frequency, $\omega_c$, in the given range.

Going back to STEP 78, if none of the eigenvalues are located in the right half of the s-plane, process 60 moves to STEP 84. At STEP 84, controller 30 identifies the dominant poles and then the worst damped dominant pole of the eigenvalues under all operating conditions. At STEP 86, controller 30 determines whether all operating conditions have been considered for solving Eqn. 39. If not, process 60 moves back to STEP 76 to solve for the eigenvalues. If so, process 60 moves to STEP 88, where controller 30 compares the worst damped dominant pole with the worst damped dominant pole of any previously identified optimal parameters for the d-axis and q-axis compensation coefficients, $k_d$, $k_q$, and the cutoff frequency, $\omega_c$.

If controller 30 determines at STEP 90 that the worst damped dominant pole of the currently selected d-axis and q-axis compensation coefficients, $k_d$, $k_q$, and cutoff frequency, $\omega_c$, is better than the previously identified optimal parameters or if no optimal parameters have been selected yet, controller 30 sets the current values for the d-axis and q-axis compensation coefficients, $k_d$, $k_q$, and the cutoff frequency, $\omega_c$, as the optimal parameters at STEP 92. If not, controller 30 discards the currently selected d-axis and q-axis compensation coefficients, $k_d$, $k_q$, and cutoff frequency, $\omega_c$, and process 60 moves to STEP 80. Again, at STEP 80, if controller 30 determines that all possible values for the d-axis and q-axis compensation coefficients, $k_d$, $k_q$, and the cutoff frequency, $\omega_c$, have not been considered, process 60 moves to STEP 76. If all possible values for the d-axis and q-axis compensation coefficients, $k_d$, $k_q$, and the cutoff frequency, $\omega_c$, have been considered, process 60 ends, and controller 30 will use the values for the d-axis and q-axis compensation coefficients, $k_d$, $k_q$, and the cutoff frequency, $\omega_c$, that were set as the optimal parameters in STEP 92 to stabilize the output of ASD 12 of FIGS. 1-2.

Beneficially, embodiments of the invention thus provide a system and method for stabilizing an output of an ASD having a small DC link thin film capacitor and controlling a motor. The ASD includes a controller that receives two phases of the output current of the ASD and a DC link voltage across the DC link thin film capacitor or capacitor bank from a plurality of sensors and a reference motor speed command. The sampled output currents of the ASD are input into an active damping module, which outputs a compensation frequency based on d-axis and q-axis compensation coefficients previously determined by the controller. The compensation frequency is added to the reference motor speed command to form a damped speed that is integrated to find a damped angle of rotation. An SVPWM block controls the inverter based on the reference motor speed command and the damped angle of rotation, which stabilizes the output of the inverter by reducing the ASD output current THD and the DC link voltage ripple on the DC link thin film capacitor. Thus, the use of the compensation frequency to damp the reference motor speed command results in a more stable output for ASDs that include DC link thin film capacitor(s).

According to one embodiment of the present invention, a control system for actively damping an output of an ASD having a DC link thin film capacitor is programmed to calculate a d-axis damping coefficient and a q-axis damping coefficient for stabilizing an output of the ASD based at least on a voltage across the DC link thin film capacitor at a steady operating point. The control system is further programmed to extract d-axis and q-axis perturbations in d-axis and q-axis output currents of the ASD using a high pass filter, damp the d-axis perturbation and the q-axis perturbation with the d-axis damping coefficient and the q-axis damping coefficient, respectively, and calculate a damping frequency based on the damped d-axis perturbation and the damped q-axis perturbation. The control system is also programmed to damp an angle of rotation of a reference motor speed command for controlling the ASD using the damping frequency.

According to another embodiment of the present invention, a method of stabilizing an ASD having a DC link thin film capacitor incorporated therein includes receiving, at a controller, input parameters comprising a current output by the ASD from a current sensor and a reference motor speed command and computing, with the controller, a d-axis stabilization factor and a q-axis stabilization factor for stabilizing the ASD based on at least one steady state voltage across the DC link thin film capacitor. The method additionally includes transforming the current output by the ASD into a d-axis current and a q-axis current with the controller, obtaining d-axis and q-axis perturbations in the d-axis and q-axis currents, respectively, with a high pass filter in the controller, and compensating the d-axis perturbation and the q-axis perturbation with the controller using the d-axis stabilization factor and the q-axis stabilization factor, respectively. Furthermore, the method includes computing a feedback frequency with the controller based on the compensated d-axis perturbation and the compensated q-axis perturbation and compensating a reference motor speed command with the feedback frequency to change an angle of rotation for controlling an inverter of the ASD.

According to yet another embodiment of the present invention, an ASD includes an input connectable to an AC source, a rectifier connected to the input to convert an AC power input to a DC power at an output thereof, and a DC link coupled to the rectifier output to receive the DC power therefrom. The DC link has a thin film capacitor and an inductor positioned thereon and is coupled to a DC side of an inverter having an AC side connectable to a motor. The ASD includes at least one current sensor configured to measure currents output from the AC side of the inverter and a control system coupled to the inverter as well. The control system is programmed to determine a d-axis compensation coefficient and a q-axis compensation coefficient designed to stabilize the ASD output currents under all operating conditions based on at least one steady operating point for a set of operating parameters including voltage across the DC link thin film capacitor and a current through the inductor. In addition, the control system is programmed to extract a perturbation in the inverter output currents from the at least one current sensor using a high pass filter, compensate a d-axis component of the perturbation using the d-axis compensation coefficient and a q-axis component of the perturbation using the q-axis compensation coefficient, and determine a compensation frequency by combining the compensated d-axis and q-axis perturbations. Moreover, the control system is programmed to add the compensation frequency to a reference motor speed command to adjust an angle of rotation for controlling the inverter and control the inverter based on the amplitude of the reference motor speed command and the adjusted angle of rotation.

The present invention has been described in terms of the preferred embodiment, and it is recognized that equivalents, alternatives, and modifications, aside from those expressly stated, are possible and within the scope of the appending claims.

What is claimed is:

1. A control system for actively damping an output of an adjustable speed drive (ASD) having a DC link thin film capacitor, the control system programmed to:
   calculate a d-axis damping coefficient and a q-axis damping coefficient for stabilizing an output of the ASD based at least on a voltage across the DC link thin film capacitor at a steady operating point;
   extract d-axis and q-axis perturbations in d-axis and q-axis output currents of the ASD using a high pass filter;
   damp the d-axis perturbation and the q-axis perturbation with the d-axis damping coefficient and the q-axis damping coefficient, respectively;
   calculate a damping frequency based on the damped d-axis perturbation and the damped q-axis perturbation; and
   damp an angle of rotation of a reference motor speed command for controlling the ASD using the damping frequency.

2. The control system of claim 1 further programmed to calculate a corner frequency for the high pass filter based at least on the DC link thin film capacitor voltage.

3. The control system of claim 1 further programmed to analyze a stability of the ASD using Lyapunov's First Method with a 7×7 matrix.

4. The control system of claim 1 further programmed to calculate the d-axis and q-axis damping coefficients using Lyapunov's First Method with a 9×9 matrix.

5. The control system of claim 1 further programmed to calculate the d-axis and q-axis damping coefficients based on a d-axis and a q-axis stator current, a d-axis and a q-axis stator flux, a rotor speed, and an inductor current at the steady operating point.

6. The control system of claim 5 further programmed to calculate the d-axis and q-axis damping coefficients based on an intermediate d-axis perturbation and an intermediate q-axis perturbation.

7. The control system of claim 1 further programmed to damp the d-axis and q-axis perturbations by multiplying the d-axis and q-axis perturbations by the d-axis and q-axis damping coefficients, respectively.

8. The control system of claim 1 further programmed to:
   add the damping frequency to the reference motor speed command to obtain a damped reference motor speed command; and
   integrate the damped reference motor speed command to obtain the damped angle of rotation.

9. The control system of claim 1 further programmed to calculate the d-axis and q-axis damping coefficients to stabilize the ASD under all rated operating conditions.

10. A method of stabilizing an adjustable speed drive (ASD) having a DC link thin film capacitor incorporated therein, the method comprising:
   receiving, at a controller, input parameters comprising a current output by the ASD from a current sensor and a reference motor speed command;
   computing, with the controller, a d-axis stabilization factor and a q-axis stabilization factor for stabilizing the ASD based on at least one steady state voltage across the DC link thin film capacitor;

transforming the current output by the ASD into a d-axis current and a q-axis current with the controller;

obtaining d-axis and q-axis perturbations in the d-axis and q-axis currents, respectively, with a high pass filter in the controller;

compensating the d-axis perturbation and the q-axis perturbation with the controller using the d-axis stabilization factor and the q-axis stabilization factor, respectively;

computing a feedback frequency with the controller based on the compensated d-axis perturbation and the compensated q-axis perturbation; and compensating a reference motor speed command with the feedback frequency to change an angle of rotation for controlling an inverter of the ASD.

11. The method of claim 10 wherein computing the d-axis and q-axis stabilization factors comprises solving Lyapunov's First Method with a square matrix having 9 rows and 9 columns.

12. The method of claim 10 further comprising analyzing the ASD using Lyapunov's First Method employing a square matrix having 7 rows and 7 columns.

13. The method of claim 10 further comprising computing, with the controller, a cutoff frequency for the high pass filter based on the at least one DC link thin film capacitor steady state voltage; and wherein obtaining d-axis and q-axis perturbations comprises applying the cutoff frequency to the d-axis and q-axis currents.

14. The method of claim 10 further comprising altering, with the controller, a space vector pulse width modulation control scheme for controlling the inverter based on the angle of rotation.

15. The method of claim 10 wherein computing the feedback frequency comprises adding the compensated d-axis perturbation and the compensated q-axis perturbation together.

16. An adjustable speed drive (ASD) comprising:
an input connectable to an AC source;
a rectifier connected to the input to convert an AC power input to a DC power at an output thereof;
a DC link coupled to the rectifier output to receive the DC power therefrom, the DC link having a thin film capacitor and an inductor positioned thereon and coupled to a DC side of an inverter having an AC side connectable to a motor;
at least one current sensor configured to measure currents output from the AC side of the inverter; and
a control system coupled to the inverter and programmed to:
determine a d-axis compensation coefficient and a q-axis compensation coefficient designed to stabilize the ASD output currents under all operating conditions based on at least one steady operating point for a set of operating parameters including voltage across the DC link thin film capacitor and a current through the inductor;
extract a perturbation in the inverter output currents from the at least one current sensor using a high pass filter;
compensate a d-axis component of the perturbation using the d-axis compensation coefficient and a q-axis component of the perturbation using the q-axis compensation coefficient;
determine a compensation frequency by combining the compensated d-axis and q-axis perturbations;
add the compensation frequency to a reference motor speed command to adjust an angle of rotation for controlling the inverter; and
control the inverter based on the amplitude of the reference motor speed command and the adjusted angle of rotation.

17. The ASD of claim 16 wherein the control system is programmed to control the inverter by:
applying a Volts per Hertz method to the reference motor speed command; and
applying a space vector pulse width modulation scheme to the inverter based on the result of the Volts per Hertz method and the adjusted angle of rotation.

18. The ASD of claim 16 wherein the control system is further programmed to determine a cutoff frequency designed to stabilize the ASD output currents under all operating conditions based on the least one steady operating point.

19. The ASD of claim 18 wherein the control system extracts the perturbation in the inverter output currents based on the cutoff frequency after the inverter output currents are transformed into d-axis and q-axis currents.

20. The ASD of claim 16 wherein the control system is programmed to determine the d-axis and q-axis compensation coefficients using Lyapunov's First Method incorporating a 9×9 matrix; and wherein the set of operating parameters further includes a d-axis stator current, a q-axis stator current, a d-axis stator flux, a q-axis stator flux, and a rotor speed.

* * * * *